US011061834B2

United States Patent
Li

(10) Patent No.: US 11,061,834 B2
(45) Date of Patent: Jul. 13, 2021

(54) METHOD AND SYSTEM FOR FACILITATING AN IMPROVED STORAGE SYSTEM BY DECOUPLING THE CONTROLLER FROM THE STORAGE MEDIUM

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 255 days.

(21) Appl. No.: 16/286,258

(22) Filed: Feb. 26, 2019

(65) Prior Publication Data
US 2020/0272583 A1    Aug. 27, 2020

(51) Int. Cl.
*G06F 13/12*    (2006.01)
*G06F 3/06*    (2006.01)
(Continued)

(52) U.S. Cl.
CPC .......... *G06F 13/126* (2013.01); *G06F 3/0605* (2013.01); *G06F 3/0607* (2013.01);
(Continued)

(58) Field of Classification Search
CPC .. G06F 12/0246; G06F 13/126; G06F 13/362; G06F 3/0605; G06F 3/0607; G06F 3/0631; G06F 3/0683
(Continued)

(56) References Cited

U.S. PATENT DOCUMENTS 3,893,071 A    7/1975 Bossen
4,718,067 A    1/1988 Peters
(Continued)

FOREIGN PATENT DOCUMENTS

WO    9418634    8/1994

OTHER PUBLICATIONS

Tsuchiya, Yoshihiro et al. "DBLK: Deduplication for Primary Block Storage", MSST 2011, Denver, CO, May 23-27, 2011 pp. 1-5.
(Continued)

*Primary Examiner* — Yaima Rigol
*Assistant Examiner* — Edward Waddy, Jr.
(74) *Attorney, Agent, or Firm* — Shun Yao; Park, Vaughan, Fleming & Dowler LLP

(57) ABSTRACT

One embodiment facilitates a storage system, which comprises a backplane and a plurality of storage medium cards coupled to the backplane. The backplane is coupled to a host via a first interface, and the backplane comprises global management circuitry coupled to a plurality of groups of components and configured to process an input/output (I/O) request and manage a mapping table. A respective group of components includes: first circuitry configured to perform first computing operations; and second circuitry configured to perform second computing operations. A respective storage medium card is allowed to operate without a controller residing on the storage medium card. Data associated with the I/O request is processed by the global management circuitry and further processed by first circuitry and second circuitry associated with a storage medium card selected for executing the I/O request.

18 Claims, 8 Drawing Sheets

(51) Int. Cl.
*G06F 13/362* (2006.01)
*G06F 12/02* (2006.01)

(52) U.S. Cl.
CPC .......... *G06F 3/0631* (2013.01); *G06F 3/0683* (2013.01); *G06F 12/0246* (2013.01); *G06F 13/362* (2013.01); *G06F 2212/7207* (2013.01)

(58) Field of Classification Search
USPC ................. 711/103, E12.008, E12.002, 115, 711/E12.001, 154
See application file for complete search history.

(56) References Cited

U.S. PATENT DOCUMENTS

| | | |
|---|---|---|
| 5,394,382 A | 2/1995 | Hu |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,457,104 B1 | 9/2002 | Tremaine |
| 6,658,478 B1 | 12/2003 | Singhal |
| 7,351,072 B2 | 4/2008 | Muff |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,281,061 B2 | 10/2012 | Radke |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,129,628 B1 | 9/2015 | Fallone |
| 9,280,472 B1 | 3/2016 | Dang |
| 9,280,487 B2 | 3/2016 | Candelaria |
| 9,336,340 B1 | 5/2016 | Dong |
| 9,436,595 B1 | 9/2016 | Benitez |
| 9,495,263 B2* | 11/2016 | Pang .................. G06F 11/2092 |
| 9,529,601 B1 | 12/2016 | Dharmadhikari |
| 9,588,698 B1 | 3/2017 | Karamcheti |
| 9,588,977 B1 | 3/2017 | Wang |
| 9,747,202 B1 | 8/2017 | Shaharabany |
| 9,852,076 B1 | 12/2017 | Garg |
| 9,875,053 B2 | 1/2018 | Frid |
| 9,912,530 B2* | 3/2018 | Singatwaria ............. H04L 1/22 |
| 1,001,316 A1 | 7/2018 | Fisher |
| 1,019,906 A1 | 2/2019 | Feldman |
| 1,022,973 A1 | 3/2019 | Natarajan |
| 1,023,519 A1 | 3/2019 | Qiu |
| 1,031,846 A1 | 6/2019 | Barzik |
| 1,043,767 A1 | 10/2019 | Koltsidas |
| 1,064,965 A1 | 5/2020 | Zaidman |
| 2001/0032324 A1 | 10/2001 | Slaughter |
| 2002/0073358 A1 | 6/2002 | Atkinson |
| 2002/0095403 A1 | 7/2002 | Chandrasekaran |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0066741 A1 | 4/2004 | Dinker |
| 2004/0103238 A1 | 5/2004 | Avraham |
| 2005/0177672 A1 | 8/2005 | Rao |
| 2005/0195635 A1 | 9/2005 | Conley |
| 2005/0235067 A1 | 10/2005 | Creta |
| 2006/0031709 A1 | 2/2006 | Hiraiwa |
| 2006/0184813 A1* | 8/2006 | Bui .................. H04L 12/12 713/320 |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0089544 A1 | 4/2009 | Liu |
| 2009/0113219 A1 | 4/2009 | Aharonov |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0332922 A1 | 12/2010 | Chang |
| 2011/0055471 A1 | 3/2011 | Thatcher |
| 2011/0099418 A1 | 4/2011 | Chen |
| 2011/0161784 A1 | 6/2011 | Selinger |
| 2011/0191525 A1 | 8/2011 | Hsu |
| 2011/0218969 A1 | 9/2011 | Anglin |
| 2011/0258514 A1 | 10/2011 | Lasser |
| 2011/0299317 A1 | 12/2011 | Shaeffer |
| 2012/0084523 A1 | 4/2012 | Littlefield |
| 2012/0089774 A1 | 4/2012 | Kelkar |
| 2012/0096330 A1 | 4/2012 | Przybylski |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0210095 A1 | 8/2012 | Nellans |
| 2012/0278579 A1 | 11/2012 | Goss |
| 2012/0284587 A1 | 11/2012 | Yu |
| 2013/0054822 A1 | 2/2013 | Mordani |
| 2013/0061029 A1 | 3/2013 | Huff |
| 2013/0080391 A1 | 3/2013 | Raichstein |
| 2013/0151759 A1 | 6/2013 | Shim |
| 2013/0191601 A1 | 7/2013 | Peterson |
| 2013/0219131 A1 | 8/2013 | Alexandron |
| 2013/0238955 A1 | 9/2013 | D Abreu |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0279927 A1 | 9/2014 | Constantinescu |
| 2014/0304452 A1 | 10/2014 | De La Iglesia |
| 2015/0019798 A1 | 1/2015 | Huang |
| 2015/0106559 A1 | 4/2015 | Cho |
| 2015/0121031 A1 | 4/2015 | Feng |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077968 A1 | 3/2016 | Sela |
| 2016/0098350 A1 | 4/2016 | Tang |
| 2016/0154601 A1 | 6/2016 | Chen |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0274636 A1 | 9/2016 | Kim |
| 2016/0306853 A1 | 10/2016 | Sabaa |
| 2016/0335085 A1* | 11/2016 | Scalabrino ............ G06F 9/3836 |
| 2016/0342345 A1 | 11/2016 | Kankani |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |

(56) References Cited

U.S. PATENT DOCUMENTS

| | | |
|---|---|---|
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0177217 A1 | 6/2017 | Kanno |
| 2017/0177259 A1 | 6/2017 | Motwani |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2018/0024779 A1 | 1/2018 | Kojima |
| 2018/0033491 A1 | 2/2018 | Marelli |
| 2018/0052797 A1 | 2/2018 | Barzik |
| 2018/0069658 A1* | 3/2018 | Benisty ............... G06F 11/00 |
| 2018/0107591 A1 | 4/2018 | Smith |
| 2018/0143780 A1 | 5/2018 | Cho |
| 2018/0167268 A1 | 6/2018 | Liguori |
| 2018/0173620 A1 | 6/2018 | Cen |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0073262 A1 | 3/2019 | Chen |
| 2019/0087115 A1 | 3/2019 | Li |
| 2019/0171532 A1 | 6/2019 | Abadi |
| 2019/0172820 A1* | 6/2019 | Meyers ............... H01L 23/28 |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0097189 A1 | 3/2020 | Tao |

OTHER PUBLICATIONS

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime", Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

* cited by examiner

US 11,061,834 B2

METHOD AND SYSTEM FOR FACILITATING AN IMPROVED STORAGE SYSTEM BY DECOUPLING THE CONTROLLER FROM THE STORAGE MEDIUM

BACKGROUND

Field

This disclosure is generally related to the field of data storage. More specifically, this disclosure is related to a method and system for facilitating an improved storage system by decoupling the controller from the storage medium.

Related Art

The proliferation of the Internet and e-commerce continues to create a vast amount of digital content. Various distributed storage systems have been created to access and store such digital content. A storage system can include volatile memory (e.g., dynamic random access memory (DRAM)) and multiple drives (e.g., a solid state drive (SSD) or a hard disk drive (HDD)). A drive can include non-volatile memory in a physical storage medium for persistent storage, such as Not-And (NAND) flash or phase change memory (PCM) in an SSD and magnetic recording media in an HDD. The memory in a server plays a crucial role in the performance and capacity of a storage system. Current off-the-shelf storage drives typically integrate the storage medium with the controller and DRAM to form a whole black-box drive. However, the hardware in current storage drives may be fixed as an application-specific integrated circuit (ASIC), which allows no flexibility for modification. Furthermore, upgrading the firmware (of the controller) in current storage drives may require taking a given drive offline for a period of time, which can result in both cost and performance inefficiencies.

Thus, in current storage drives, the storage medium is limited by the design of the hardware and firmware of the controller. As a result, the utilization and efficiency of the storage medium are dependent upon the design of the controller, which can limit optimization of reliability, performance, and cost for the overall storage system. Moreover, the controller ASIC can typically maintain a lower mis-functioning rate than the storage medium due to the fabrication process and utilization, and the controller ASIC and the storage medium generally have a very different lifespan. If one storage drive experiences a storage medium failure (e.g., NAND failure), the entire storage drive may need to be replaced, which is not efficient given the high cost of current storage drives (e.g., high-capacity SSDs) and can also affect the total cost of ownership (TCO).

SUMMARY

One embodiment facilitates a storage system, which comprises a backplane and a plurality of storage medium cards coupled to the backplane. The backplane is coupled to a host via a first interface, and the backplane comprises global management circuitry coupled to a plurality of groups of components and configured to process an input/output (I/O) request and manage a mapping table. A respective group of components includes: first circuitry configured to perform first computing operations; and second circuitry configured to perform second computing operations. A respective storage medium card is allowed to operate without a controller residing on the storage medium card. Data associated with the I/O request is processed by the global management circuitry and further processed by first circuitry and second circuitry associated with a storage medium card selected for executing the I/O request.

In some embodiments, a determined group of components comprises the first circuitry, the second circuitry, and a slot for the selected storage medium card for executing the I/O request. The selected storage medium card is coupled to the slot of the determined group via a second interface.

In some embodiments, the second circuitry of the determined group can operate on the data associated with the I/O request prior to accessing the selected storage medium card to execute the I/O request.

In some embodiments, the first interface is based on one or more of: a peripheral component interconnect express (PCIe) protocol; a Gen-Z technology; and a cache coherent interconnect for accelerators (CCIX) protocol.

In some embodiments, for a respective group of components, the first circuitry and the second circuitry of the respective group work together to manage a slot of the respective group, wherein the slot allows a storage medium card to couple to the backplane.

In some embodiments, the global management circuitry is further configured to manage the mapping table as a flash translation mapping table across the groups of components and storage medium cards coupled to respective slots of respective groups.

In some embodiments, the backplane further comprises: a volatile memory coupled to the global management circuitry; and a non-volatile memory coupled to the global management circuitry and configured to store a logic design for the global management circuitry and respective first circuitry of respective groups.

In some embodiments, the non-volatile memory comprises a Not-Or flash memory.

In some embodiments, the first computing operations include one or more of: an encoding or a decoding based on an error correction code; an operation based on an exclusive OR; a cyclic redundancy check; an encryption or a decryption based on an algorithm; an operation based on a modulation; and providing an interface to a physical medium, a storage medium card, or a storage medium card coupled to a respective slot of a respective group of components residing on the backplane.

In some embodiments, the second computing operations include one or more of: a compression or a decompression of data associated with the I/O request; a compaction or a decompaction of data associated with the I/O request; a video transcoding operation; a projecting operation; an encoding or a decoding based on an erasure code; a filtering operation; and a de-duplicating operation.

Another embodiment facilitates a storage system. During operation, the system receives, from a host coupled to a backplane via a first interface, an input/output (I/O) request with associated data, wherein the backplane comprises global management circuitry coupled to a plurality of groups of components, and wherein a respective group of components includes first circuitry, second circuitry, and a slot for a storage medium card which is allowed to operate without a controller residing on the storage medium card. The system processes, by the global management circuitry, the I/O request. The system manages, by the global management circuitry, a flash translation layer mapping table based on the data associated with the I/O request. The system determines a group of components and a storage medium card to access for executing the I/O request, wherein the determined storage medium card is coupled to the slot of the determined group. The system performs, by first circuitry of the determined group, general-purpose computing operations based on the data associated with the I/O request. The system performs, by second circuitry of the determined group, near-storage computing operations based on the data associated with the I/O request. The system executes the I/O request by accessing the determined storage medium card.

BRIEF DESCRIPTION OF THE FIGURES

In the figures, like reference numerals refer to the same figure elements.

DETAILED DESCRIPTION

Figure 1:
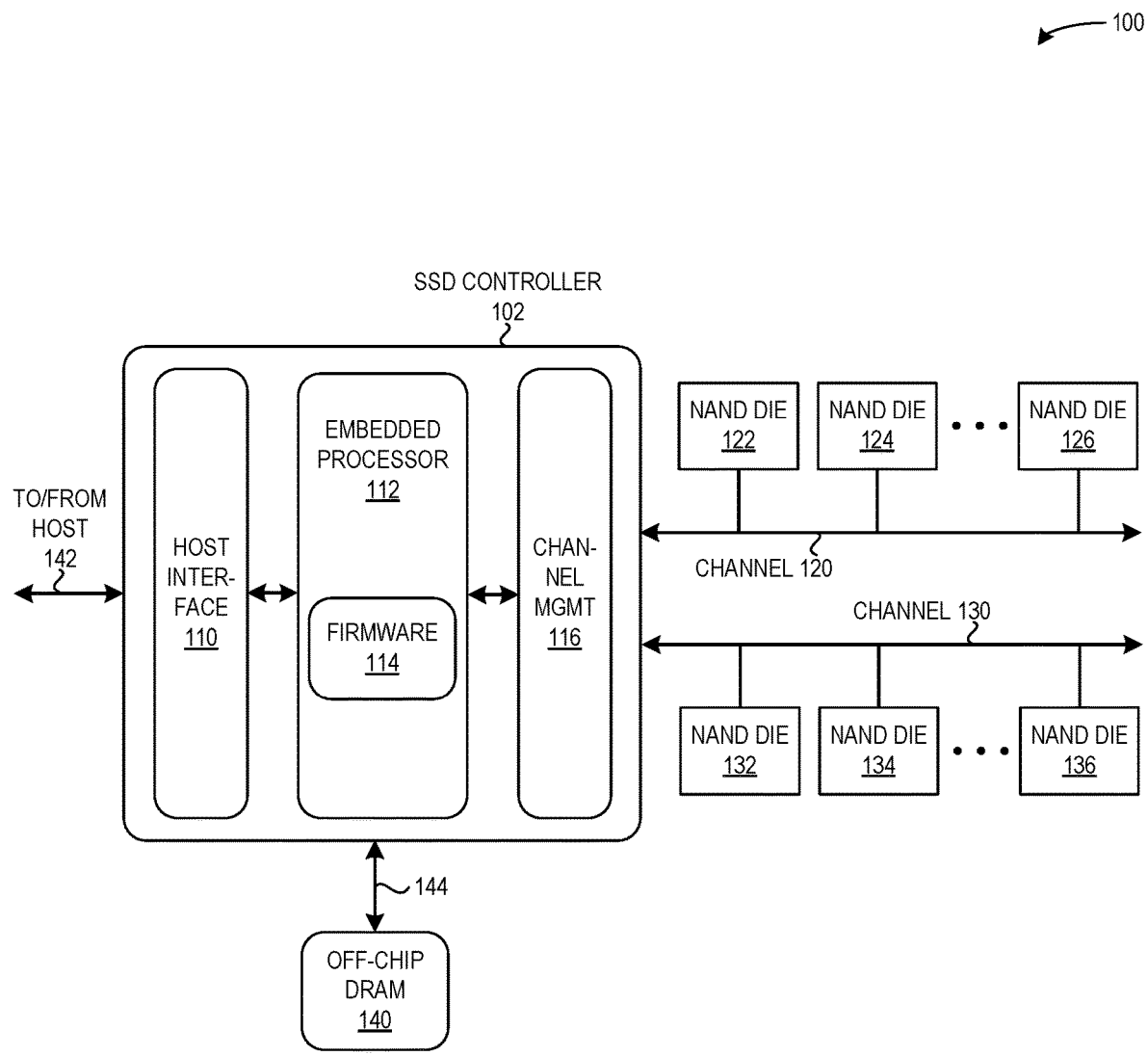
FIG. 1 illustrates an exemplary internal structure of a solid state drive (SSD), in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of increasing the efficiency and performance of a storage system by decoupling the controller from the storage medium.

As described above, current off-the-shelf storage drives typically integrate the storage medium with the controller and DRAM to form a whole black-box drive, as described below in relation to FIG. 1. However, the hardware in current storage drives may be fixed as an application-specific integrated circuit (ASIC), which allows no flexibility for modification. Furthermore, upgrading the firmware (of the controller) in current storage drives may require taking a given drive offline for a period of time, which can result in both cost and performance inefficiencies.

Thus, in current storage drives, the storage medium is limited by the design of the hardware and firmware of the controller. As a result, the utilization and efficiency of the storage medium are dependent upon the design of the controller, which can limit optimization of reliability, performance, and cost for the overall storage system. Moreover, the controller ASIC can typically maintain a lower misfunctioning rate than the storage medium due to the fabrication process and utilization, and the controller ASIC and the storage medium generally have a very different lifespan. If one storage drive experiences a storage medium failure (e.g., NAND failure), the entire storage drive may need to be replaced, which is not efficient given the high cost of current storage drives (e.g., high-capacity SSDs) and can also affect the total cost of ownership (TCO).

The embodiments described herein address these challenges by providing a system which decouples the hardware and firmware of the controller from the storage medium. The system distributes the functionality of a conventional storage drive controller into data-intensive processing implemented with, e.g., an ASIC, and reprogrammable logic implemented with, e.g., FPGAs, as described below in relation to FIG. 2.

Thus, by decoupling the controller from the storage medium, the embodiments described herein facilitate an improved storage system, which allows for more flexibility in the utilization of the storage medium, re-programmability as needed for specific applications, and offloading of various computing operations.

A "storage drive" refers to a device or a drive with a non-volatile memory which can provide persistent storage of data, e.g., a solid state drive (SSD) or a hard disk drive (HDD).

A "storage server" or a "storage node" refers to a computing device which can include multiple storage drives. A distributed storage system can include multiple storage servers or storage nodes.

The term "backplane" refers to a group of electrical connectors in parallel with each other. A backplane can use a printed circuit board or other hardware (e.g., wire-wrapped backplane). In this disclosure, a backplane can be coupled to a host via a first interface, and can also be coupled to storage medium cards via second interface (and via slots of respective groups of components), as described below in relation to FIGS. 2 and 4. In some embodiments, backplane pins can pass directly into the slot for a respective storage medium card without cables.

The term "global management circuitry" refers to circuitry which is coupled to a plurality of groups of components. The global management circuitry can be configured to perform certain management-level functions, including I/O scheduling and managing the FTL mapping table. In this disclosure, one example of global management circuitry is referred to as a "high-end FPGA." Exemplary operations performed by the global management circuitry or a high-end FPGA are described below in relation to FIG. 5.

A "group of components" in this disclosure can include "first circuitry" and "second circuitry." The first circuitry can be configured to perform general-purpose computing operations. In this disclosure, one example of the first circuitry is an application-specific integrated circuit (ASIC). Exemplary operations performed by the first circuitry or an ASIC are described below in relation to FIG. 5. The second circuitry can be configured to perform near-storage computing operations. In this disclosure, one example of the second circuitry is referred to as a "low-end FPGA." Exemplary operations performed by the second circuitry or low-end FPGA are described below in relation to FIG. 5. In some embodiments, a group of components can also include a slot for a physical storage medium card.

Exemplary Internal Structure of an SSD in the Prior Art

FIG. 1 illustrates an exemplary internal structure of a solid state drive (SSD) 100, in accordance with the prior art. SSD 100 can include an SSD controller 102, which communicates with a host via a communication to/from host 142. SSD controller 102 can also include: a host interface 110 for communicating with the host; an embedded processor 112 with firmware 114; and a channel management module 116 for managing data via channels 120 and 130 to and from the physical media of, respectively, NAND dies 122, 124, and 126 and NAND dies 132, 134, and 136. SSD controller 102 can also communicate with an off-chip DRAM 140 via a communication 144.

SSD controller 102 is depicted with hardware and firmware which work together to perform the functions of, e.g. interfacing with the host; managing, maintaining, and updating the FTL mapping table; interfacing with the channels of the storage medium; and performing various computing operations.

Thus, the storage medium is limited by the design of the controller hardware and firmware, and consequently, the utilization and efficiency of the storage medium are dependent upon the design of the controller. This can limit optimization of reliability, performance, and cost for the overall system, and can also affect the cost of ownership (TCO).

Figure 2:
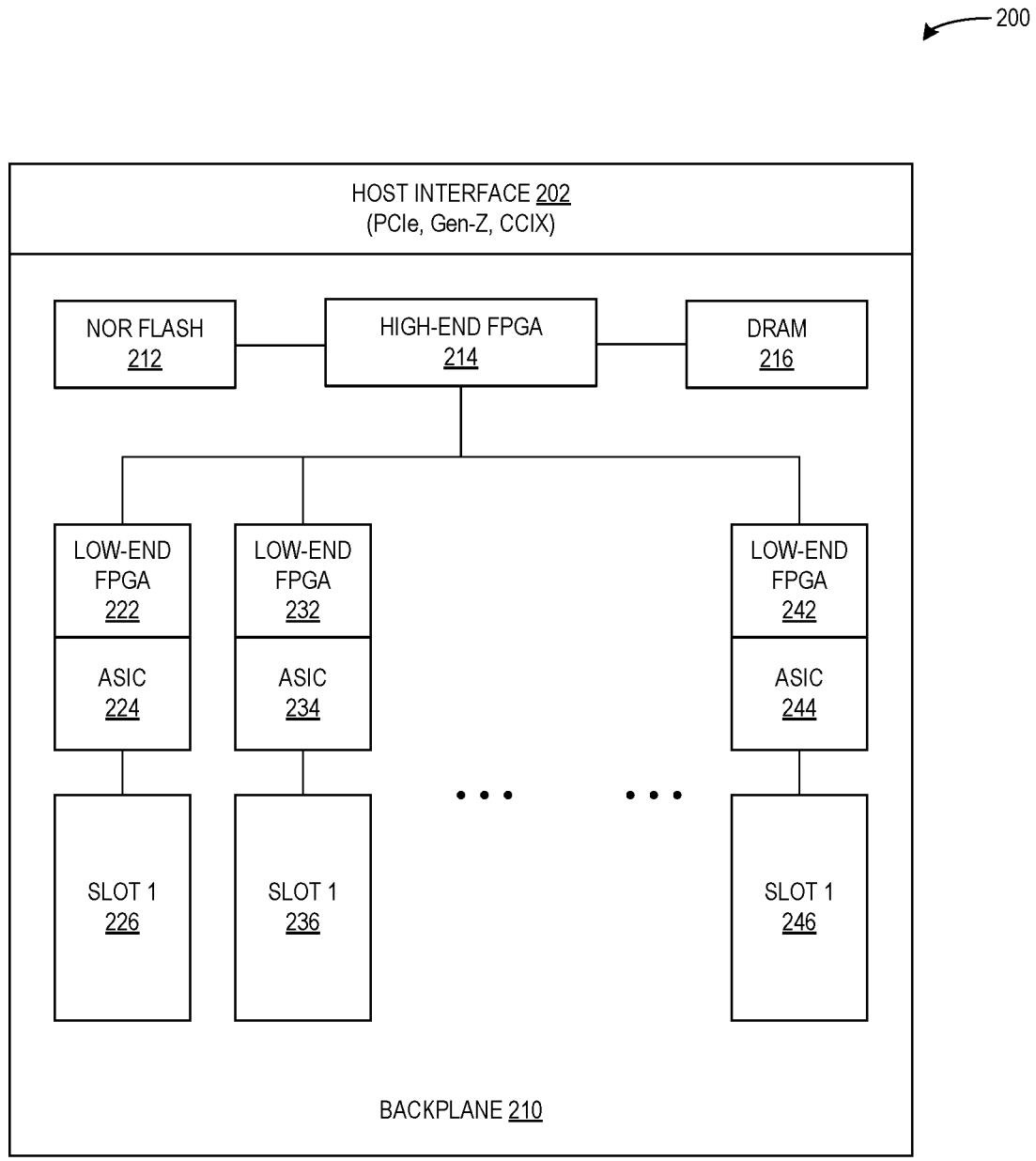
FIG. 2 illustrates an exemplary environment which facilitates a storage system, including a backplane with controller functionality performed by global management circuitry and a plurality of groups of components, in accordance with an embodiment of the present application.

Exemplary Environment for Facilitating a Storage System by Decoupling the Controller from the Storage Medium: Backplane and Circuitry FIG. 2 illustrates an exemplary environment 200 which facilitates a storage system, including a backplane 210 with controller functionality performed by global management circuitry and a plurality of groups of components, in accordance with an embodiment of the present application. Environment 200 can include backplane 210, which communicates with a host via a host interface 202. Host interface 202 can be based on, e.g., a peripheral component interconnect express (PCIe) protocol, a Gen-Z technology, or a cache coherent interconnect for accelerators (CCIX) protocol.

Backplane 210 can also include global management circuitry coupled to a non-volatile memory, a volatile memory, and a plurality of groups of components. For example, a high-end FPGA 214 (i.e., global management circuitry) can be coupled to a NOR flash 212 (i.e., a non-volatile memory) and a DRAM 216 (i.e., a volatile memory). A respective group of components can include first circuitry, second circuitry, and a slot for a storage medium card which is allowed to operate without a controller residing on the storage medium card. For example, a group of components can include a low-end FPGA 222 (i.e., first circuitry), an ASIC 224 (i.e., second circuitry), and a slot 1 226.

High-end FPGA 214 can include strong processors which can run operating systems (e.g., Linux) as well as the flash translation layer for the multiple storage medium cards connected or coupled to the groups of components via the slots (e.g., slot 1 226, slot 2 236, and slot 3 246). DRAM 216 can store the FTL mapping table and incoming data (or data associated with an I/O request). NOR flash 212 can store a logic design for high-end FPGA 214 and the low-end FPGAs of the groups of components (e.g., low-end FPGAs 222, 232, and 242). Because NOR flash 212 stores the relevant images for the logic design of the FPGAs, the system can download the images into the FPGAs to instantly resolve FPGA faults, such as a multi-cell upset. Each low-end FPGA and ASIC of a respective group of components can work together to manage the slot of the respective group, where the slot is used to connect a storage medium card which does not include a controller. A storage medium card which is allowed to operate without a controller residing on the storage medium card is described below in relation to FIG. 3. Each slot can be designed to provide high-availability and high-throughput to connect to a high-capacity storage medium card.

Backplane 210 can thus integrate all of these described components, and, along with a suitably designed signal integrity and power integrity, can provide an efficient and improved system for mass production.

Exemplary Environment for Facilitating Write Operations

Figure 3:
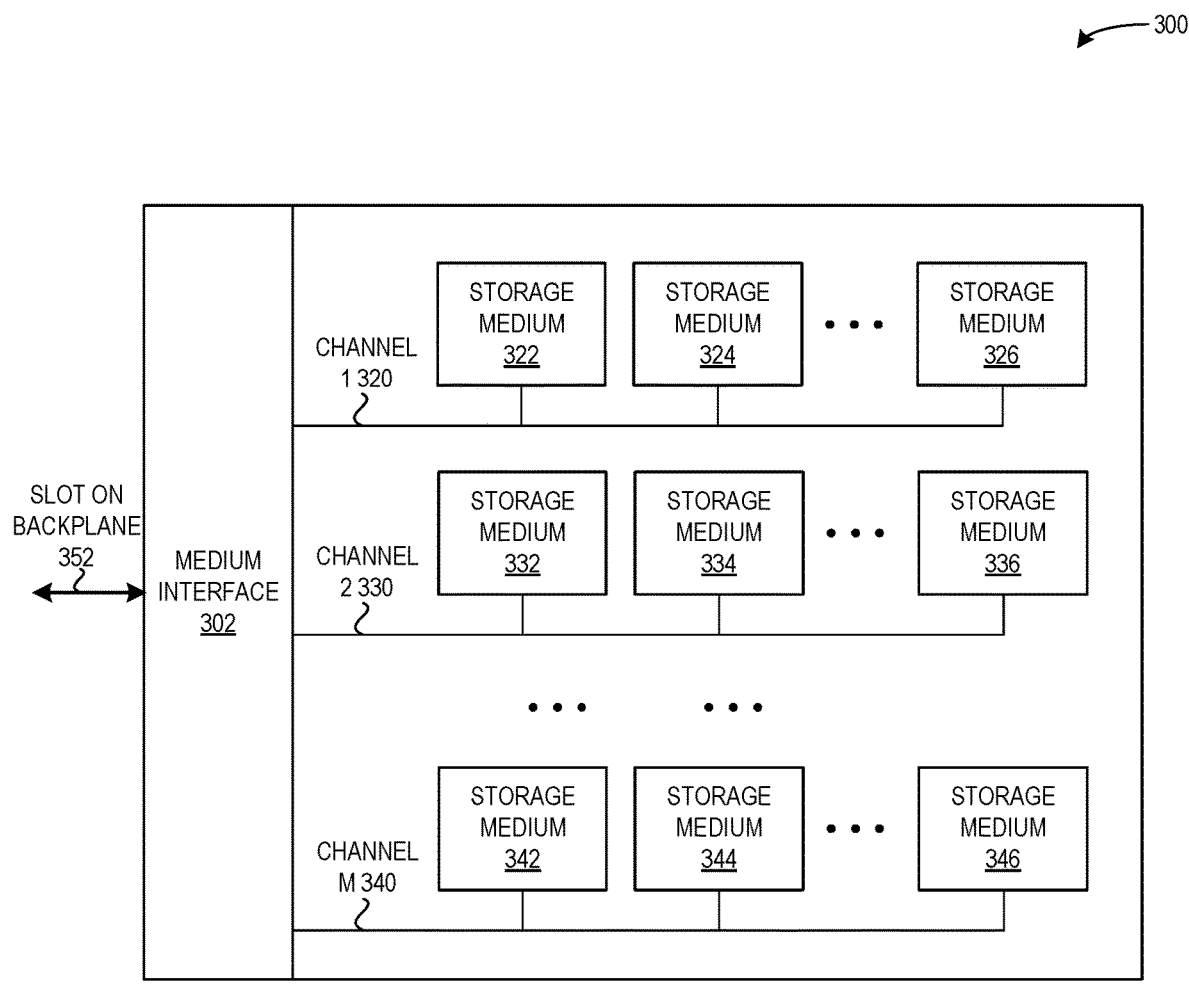
FIG. 3 illustrates an exemplary high-capacity storage medium card connected to a backplane, in accordance with an embodiment of the present application.

FIG. 3 illustrates an exemplary high-capacity storage medium card 300 connected to a backplane, in accordance with an embodiment of the present application. Storage medium card 300 can be coupled to a slot on a backplane (352) via a medium interface 302. Medium interface 302 can be, e.g., based on a Toggle protocol to achieve a high frequency.

To increase the parallelism for achieving a high throughput, storage medium card 300 can also include multiple channels via which to access physical storage media. Multiple channels can allow the system to fully utilize the bandwidth of each storage medium card. For example, storage medium card 300 can include a channel 1 320, a channel 2 330, and a channel M 340. Storage media 322, 324, and 326 can be accessed via channel 1 320; storage media 332, 334, and 336 can be accessed via channel 2 330; and storage media 342, 344, and 346 can be accessed via channel M 340. Storage medium card 300 does not include a controller, or any controller hardware/firmware. That is, storage medium card 300 can be allowed to operate without a controller residing on storage medium card 300.

Furthermore, storage medium card 300 can be a hot pluggable card, which can be conveniently replaced online. That is, if the system experiences a storage medium card error ("defective card"), the system can replace the defective card. The system can backfill and re-balance the data from the defective card through a distributed storage system. While offline, the defective card may be fixed with a hardware solution to fix the physical storage medium issue ("fixed card"). Upon being processed through the embodiments described herein, the system can use the fixed card again, which can result in a significant decrease in the total cost of ownership (TCO), especially as hyperscale storage systems continue to grow in scale.

Exemplary Environment for Facilitating a Storage System

Figure 4:
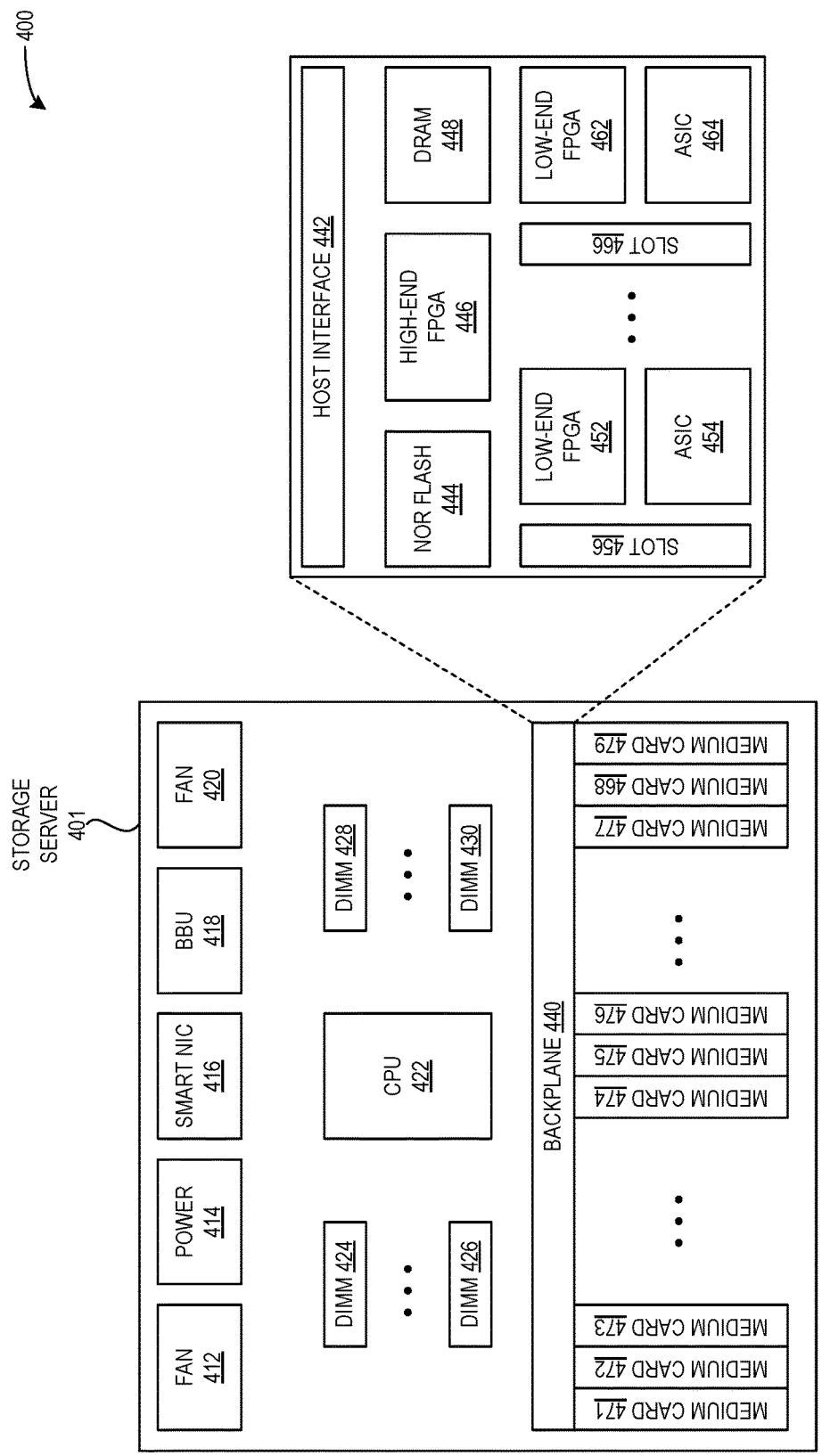
FIG. 4 illustrates an exemplary environment which facilitates a storage system, including a storage server which includes a backplane and storage medium cards, in accordance with an embodiment of the present application.

FIG. 4 illustrates an exemplary environment 400 which facilitates a storage system, including a storage server 401 which includes a backplane and storage medium cards, in accordance with an embodiment of the present application. Storage server 401 can include a fan 412, a power unit 414, a smart network interface card (NIC) 416, a battery backup unit (BBU) 418, a fan 420, a central processing unit (CPU) 422, and dual in-line memory modules (DIMMs) 424, 426, 428, and 430.

Storage server 401 can also include a backplane 440 and a plurality of storage medium cards 471-479. Backplane 440 is similar to backplane 210 of FIG. 2. Backplane 440 can include a host interface 442, NOR flash 444, a high-end FPGA 446, DRAM 448, and a plurality of groups of components. One group of components can include a low-end FPGA 452, an ASIC 454, and a slot 456. Another group of components can include a low-end FPGA 462, an ASIC 464, and a slot 466. Each slot of a group can be connected or coupled to a storage medium card. For example, storage medium card 472 can be connected or coupled to slot 456, and storage medium card 476 can be connected or coupled to slot 466.

Thus, environment 400 depicts how backplane 440 can bridge or couple host interface 442 with the storage medium interface (not shown) on each storage medium card (i.e., storage medium cards 471-479). By including three main modules in backplane 440 (i.e., the high-end FPGA, the low end-FPGA, and the ASIC), backplane 440 allows the three main modules to work together to perform different functions, described below in relation to FIG. 5. These modules can collaborate together, which results in an improved storage system. That is, backplane 440 allows for a simplification in the design of overall storage server 401 by enabling a general purpose standard storage medium (e.g., the hot pluggable and controller-less storage medium cards 471-479). Furthermore, backplane 440 can handle operations related to both the protocol conversions and the performance assurance.

Exemplary Functions Performed by Circuitry

Figure 5:
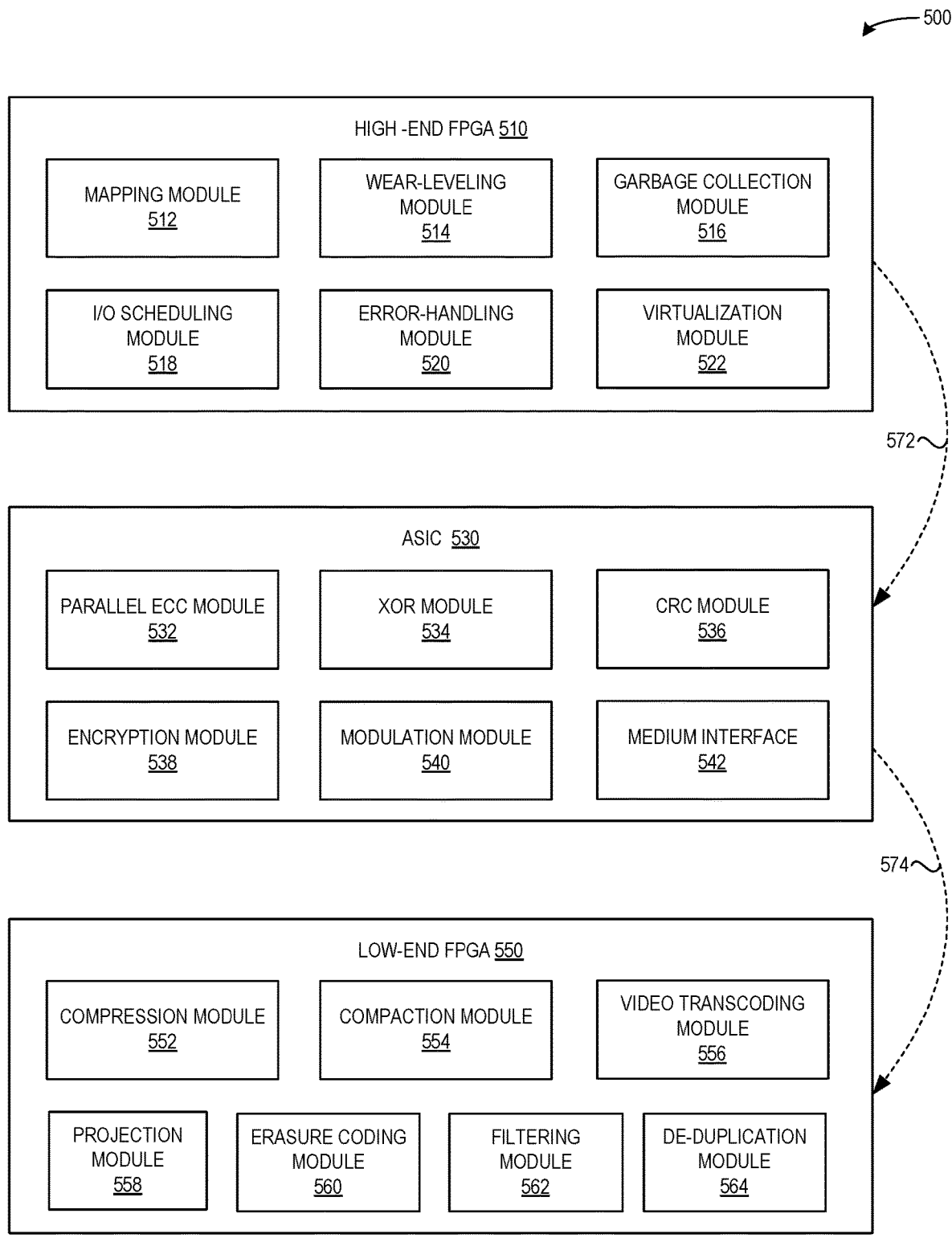
FIG. 5 illustrates exemplary functions performed by the global management circuitry and the components of FIG. 4, in accordance with an embodiment of the present application.

FIG. 5 illustrates exemplary functions 500 performed by the global management circuitry and the components of FIG. 4, in accordance with an embodiment of the present application. A high-end FPGA 510 can include components or modules which can perform various functions. For example, high-end FPGA 510 can include: a mapping module 512; a wear-leveling module 514; a garbage collection module 516; an I/O scheduling module 518; an error-handling module 520; and a virtualization module 522. An ASIC 530 can include components or modules which can perform various functions. For example, ASIC 530 can include: a parallel error correction coding (ECC) module 532; an Exclusive-Or (XOR) module 534; a cyclic redundancy check (CRC) module 536; an encryption module 538; a modulation module 540; and a medium interface 542. A low-end FPGA 550 can include components or modules which can perform various functions. For example, low-end FPGA 550 can include: a compression module 552; a compaction module 554; a video transcoding module 556; a projection module 558; an erasure coding (EC) module 560; a filtering module 562; and a de-duplication module 564.

Data can be processed by the modules/components/circuitry of the backplane by moving from high-end FPGA 510 (via a communication 572) to ASIC 530, and from ASIC 530 (via a communication 574) to low-end FPGA 550. Furthermore, a module which performs a function can also perform an opposite or reverse function. For example: parallel ECC module 532 can perform both encoding and decoding based on an ECC; encryption module 538 can perform both encryption and decryption based on an (encryption/decryption) algorithm; compression module 552 can perform both compression and decompression; and compaction module 554 can perform both compaction and decompaction. In some embodiments, a separate module (not shown) can perform the opposite or reverse function of a module depicted in FIG. 5. For example: ASIC 530 can include a decryption module (not shown) and low-end FPGA 550 can include a decompression module (not shown).

Exemplary Method for Facilitating a Storage System

Figure 6:
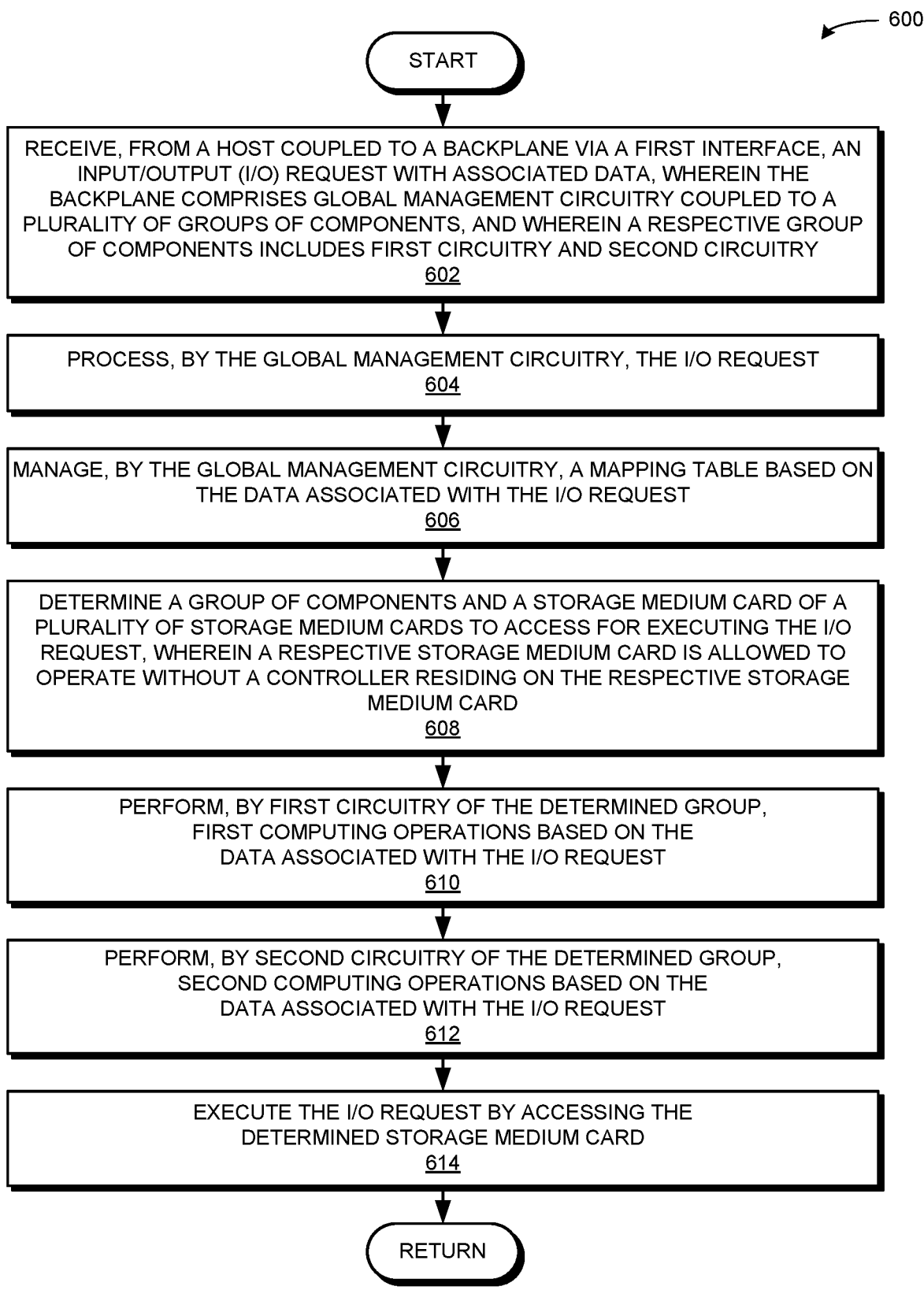
FIG. 6 presents a flowchart illustrating a method for facilitating a storage system, in accordance with an embodiment of the present application.

FIG. 6 presents a flowchart 600 illustrating a method for facilitating a storage system, in accordance with an embodiment of the present application. During operation, the system receives, from a host coupled to a backplane via a first interface, an input/output (I/O) request with associated data, wherein the backplane comprises global management circuitry coupled to a plurality of groups of components, and wherein a respective group of components includes first circuitry and second circuitry (operation 602). The system processes, by the global management circuitry, the I/O request (operation 604). The system manages, by the global management circuitry, a mapping table based on the data associated with the I/O request (operation 606). The mapping table can be a flash translation layer mapping table which maps logical addresses to physical addresses across the groups of components and storage medium cards of the system. The system determines a group of components and a storage medium card of a plurality of storage medium cards to access for executing the I/O request, wherein a respective storage medium card is allowed to operate without a controller residing on the storage medium card (operation 608).

The system performs, by first circuitry of the determined group, first computing operations based on the data associated with the I/O request (operation 610). The first computing operations can include general-purpose computing operations, such as the data-intensive and general-purpose computing operations of ASIC 530 of FIG. 5. The system performs, by second circuitry of the determined group, second computing operations based on the data associated with the I/O request (operation 612). The second computing operations can include near-storage computing operations, such as the in-situ operations and flexible configuration of low-end FPGA 550 of FIG. 5. The system executes the I/O request by accessing the determined storage medium card (operation 614), and the operation returns.

Exemplary Computer System and Apparatus

Figure 7:
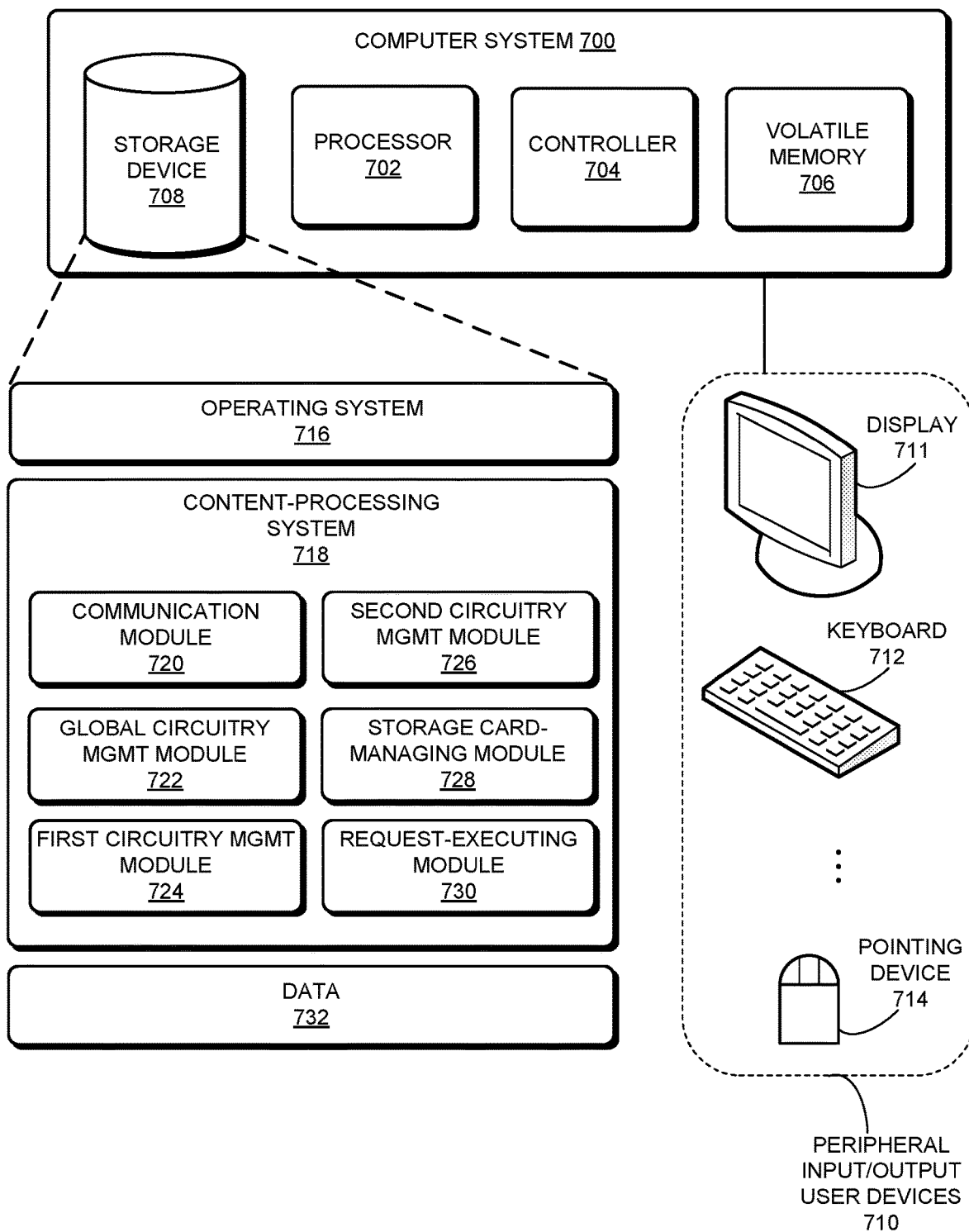
FIG. 7 illustrates an exemplary computer system that facilitates a storage system, in accordance with an embodiment of the present application.

FIG. 7 illustrates an exemplary computer system 700 that facilitates a storage system, in accordance with an embodiment of the present application. Computer system 700 includes a processor 702, a controller 704, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via controller 704. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 732.

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, an input/output (I/O) request (e.g., a read request or a write request), and data associated with an I/O request (communication module 720).

Content-processing system 718 can include instructions for receiving, from a host coupled to a backplane via a first interface, an input/output (I/O) request with associated data, wherein the backplane comprises global management circuitry coupled to a plurality of groups of components, and wherein a respective group of components includes first circuitry and second circuitry (communication module 720). Content-processing system 718 can include instructions for processing, by the global management circuitry, the I/O request (global circuitry management module 722, similar to high-end FPGA 214 of FIG. 2 and high-end FPGA 446 of FIG. 4). Content-processing system 718 can include instructions for managing, by the global management circuitry, a mapping table based on the data associated with the I/O request (global circuitry management module 722). Content-processing system 718 can include instructions for determining a group of components and a storage medium card of a plurality of storage medium cards to access for executing the I/O request, wherein a respective storage medium card is allowed to operate without a controller residing on the storage medium card (storage card-managing module 728 and request-executing module 730). Content-processing system 718 can include instructions for performing, by first circuitry of the determined group, first computing operations based on the data associated with the I/O request (first circuitry management module 724, similar to ASIC 224 of FIG. 2 and ASIC 454 of FIG. 4). Content-processing system 718 can include instructions for performing, by second circuitry of the determined group, second computing operations based on the data associated with the I/O request (second circuitry management module 726, similar to low-end FPGA 222 of FIG. 2 and low-end FPGA 452 of FIG. 4). Content-processing system 718 can include instructions for executing the I/O request by accessing the determined storage medium card (request-executing module 730).

Data 732 can include any data that is required as input or that is generated as output by the methods and/or processes described in this disclosure. Specifically, data 732 can store at least: data; a request; a read request; a write request; an input/output (I/O) request; data associated with a read request, a write request, or an I/O request; an indicator of a group of components, first circuitry, second circuitry, a slot, or a storage medium card; data associated with an operation performed by circuitry, global management circuitry, an ASIC, or an FPGA; processed data, including data on which a general-purpose or a near-storage computing operation has been performed; an indicator of a volatile memory or a non-volatile memory; a logic design; a protocol for a first interface; and a protocol for a second interface.

Figure 8:
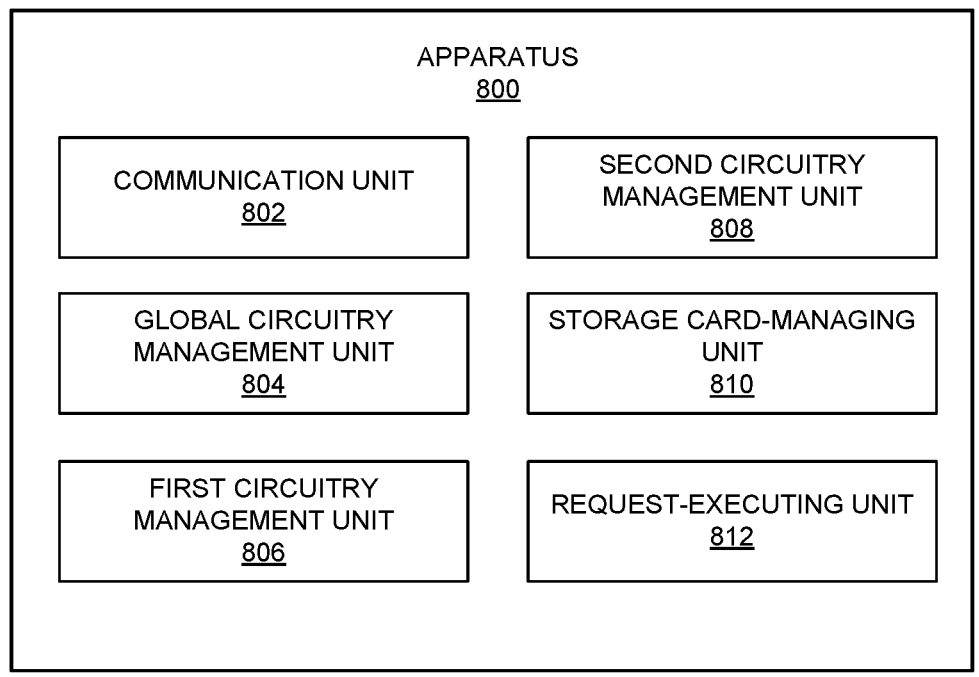
FIG. 8 illustrates an exemplary apparatus that facilitates a storage system, in accordance with an embodiment of the present application.

FIG. 8 illustrates an exemplary apparatus that facilitates a storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-812 which perform functions or operations similar to modules 720-730 of computer system 700 of FIG. 7, including: a communication unit 802; a global circuitry management unit 804; a first circuitry management unit 806; a second circuitry management unit 808; a storage card-managing unit 810; and a request-executing unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A storage system, comprising:
   a backplane coupled to a host via a first interface, wherein the backplane comprises:
   global management circuitry coupled to a plurality of groups of components; and
   a plurality of storage medium cards coupled to the backplane, wherein a respective storage medium card is allowed to operate without a controller residing on the storage medium card,
   wherein a respective group of components includes first circuitry configured to perform first computing operations, second circuitry configured to perform second computing operations, and a slot for an associated storage medium card; and
   wherein the global management circuitry is configured to:
   receive, from the host coupled to the backplane, an input/output (I/O) request with associated data;
   manage a flash translation layer mapping table which maps logical addresses to physical addresses across the groups of components and storage medium cards coupled to respective slots of respective groups; and
   select, based on the FTL mapping table, a storage medium card for executing the I/O request;
   wherein data associated with the I/O request is processed by the global management circuitry and by first circuitry and second circuitry associated with the selected storage medium card selected, which comprises:
   performing, by the global management circuitry, management-level operations to obtain first processed data;
   performing, by the first circuitry based on the first processed data, general purpose computing operations to obtain second processed data; and
   performing, by the second circuitry based on the second processed data, near-storage computing operations to obtain third processed data.

2. The storage system of claim 1, wherein a determined group of components comprises the first circuitry, the second circuitry, and a slot for the selected storage medium card for executing the I/O request, and wherein the selected storage medium card is coupled to the slot of the determined group via a second interface.

3. The storage system of claim 2, wherein the second circuitry of the determined group can operate on the data associated with the I/O request prior to accessing the selected storage medium card to execute the I/O request.

4. The storage system of claim 1, wherein the first interface is based on one or more of:
a peripheral component interconnect express (PCIe) protocol;
a Gen-Z technology; and
a cache coherent interconnect for accelerators (CCIX) protocol.

5. The storage system of claim 1, wherein for a respective group of components, the first circuitry and the second circuitry of the respective group work together to manage a slot of the respective group, wherein the slot allows a storage medium card to couple to the backplane.

6. The storage system of claim 1, wherein the backplane further comprises:
a volatile memory coupled to the global management circuitry; and
a non-volatile memory coupled to the global management circuitry and configured to store a logic design for the global management circuitry and respective first circuitry of respective groups.

7. The storage system of claim 6, wherein the non-volatile memory comprises a Not-Or flash memory.

8. The storage system of claim 1, wherein the first computing operations and the general purpose computing operations include one or more of:
an encoding or a decoding based on an error correction code;
an operation based on an exclusive OR;
a cyclic redundancy check;
an encryption or a decryption based on an algorithm;
an operation based on a modulation; and
providing an interface to a physical medium, a storage medium card, or a storage medium card coupled to a respective slot of a respective group of components residing on the backplane.

9. The storage system of claim 1, wherein the second computing operations and the near-storage computing operations include one or more of:
a compression or a decompression of data associated with the I/O request;
a compaction or a decompaction of data associated with the I/O request;
a video transcoding operation;
a projecting operation;
an encoding or a decoding based on an erasure code;
a filtering operation; and
a de-duplicating operation.

10. A computer-implemented method for facilitating a storage system, the method comprising:
receiving, from a host coupled to a backplane via a first interface, an input/output (I/O) request with associated data,
wherein the backplane comprises: global management circuitry coupled to a plurality of groups of components; and a plurality of storage medium cards coupled to the backplane, wherein a respective storage medium card is allowed to operate without a controller residing on the storage medium card,
wherein a respective group of components includes first circuitry, second circuitry, and a slot for an associated storage medium card;
processing, by the global management circuitry, the I/O request;
managing, by the global management circuitry, a mapping table based on the data associated with the I/O request, wherein the mapping table maps logical addresses to physical addresses across the groups of components and storage medium cards coupled to respective slots of respective groups;
determining a group of components and a storage medium card to access for executing the I/O request;
performing, by the global management circuitry, management-level operations on the associated data to obtain first processed data;
performing, by first circuitry of the determined group based on the first processed data, general purpose computing operations to obtain second processed;
performing, by second circuitry of the determined group based on the second processed data, near-storage computing operations to obtain third processed data; and
executing, based on the third processed data, the I/O request by accessing the determined storage medium card.

11. The method of claim 10, wherein the determined group of components comprises the first circuitry, the second circuitry, and a slot for the determined storage medium card for executing the I/O request, and wherein the determined storage medium card is coupled to the slot of the determined group via a second interface.

12. The method of claim 10, wherein the second circuitry of the determined group can operate on the data associated with the I/O request prior to accessing the determined storage medium card to execute the I/O request.

13. The method of claim 10, wherein the first interface is based on one or more of:
a peripheral component interconnect express (PCIe) protocol;
a Gen-Z technology; and
a cache coherent interconnect for accelerators (CCIX) protocol.

14. The method of claim 10, wherein for a respective group of components, the first circuitry and the second circuitry of the respective group work together to manage a slot of the respective group, wherein the slot allows a storage medium card to couple to the backplane.

15. The method of claim 10, wherein the backplane further comprises:
a volatile memory coupled to the global management circuitry; and
a non-volatile memory coupled to the global management circuitry and configured to store a logic design for the global management circuitry and respective first circuitry of respective groups.

16. The method of claim 15, wherein the non-volatile memory comprises a Not-Or flash memory.

17. The method of claim 10, wherein the first computing operations and the general purpose computing operations include one or more of:
an encoding or a decoding based on an error correction code;
an operation based on an exclusive OR;
a cyclic redundancy check;
an encryption or a decryption based on an algorithm;
an operation based on a modulation; and
providing an interface to a physical medium, a storage medium card, or a storage medium card coupled to a respective slot of a respective group of components residing on the backplane.

18. The method of claim 10, wherein the second computing operations and the near-storage computing operations include one or more of:
- a compression or a decompression of data associated with the I/O request;
- a compaction or a decompaction of data associated with the I/O request;
- a video transcoding operation;
- a projecting operation;
- an encoding or a decoding based on an erasure code;
- a filtering operation; and
- a de-duplicating operation.

* * * * *